(12) United States Patent
Aliakseyeu et al.

(10) Patent No.: US 9,041,731 B2
(45) Date of Patent: May 26, 2015

(54) METHOD AND A USER INTERACTION SYSTEM FOR CONTROLLING A LIGHTING SYSTEM, A PORTABLE ELECTRONIC DEVICE AND A COMPUTER PROGRAM PRODUCT

(75) Inventors: Dzmitry Viktorovich Aliakseyeu, Eindhoven (NL); Jonathan David Mason, Waalre (NL); Dirk Valentinus René Engelen, Heusden-Zolder (BE); Johannes Weda, Nijmegen (NL); Bartel Marinus Van De Sluis, Eindhoven (NL)

(73) Assignee: Koninklijkle Philips N.V., Eindhoven (NL)

( * ) Notice: Subject to any disclaimer, the term of this patent is extended or adjusted under 35 U.S.C. 154(b) by 90 days.

(21) Appl. No.: 13/879,057

(22) PCT Filed: Oct. 13, 2011

(86) PCT No.: PCT/IB2011/054542
§ 371 (c)(1),
(2), (4) Date: Apr. 12, 2013

(87) PCT Pub. No.: WO2012/049656
PCT Pub. Date: Apr. 19, 2012

(65) Prior Publication Data
US 2013/0214698 A1    Aug. 22, 2013

(30) Foreign Application Priority Data

Oct. 5, 2010    (EP) ........................... 1018769

(51) Int. Cl.
*G09G 5/00*      (2006.01)
*H05B 37/02*     (2006.01)
(Continued)

(52) U.S. Cl.
CPC ............ *H05B 37/0245* (2013.01); *G06F 3/011* (2013.01); *G06T 11/60* (2013.01); *H05B 37/0272* (2013.01); *H05B 37/029* (2013.01)

(58) Field of Classification Search
CPC ..... G06T 11/60; G06F 3/011; H05B 37/0272; H05B 37/0245; H05B 37/029
USPC ......... 382/162, 163, 164, 165, 166, 167, 131; 345/2.1, 2.2, 204, 207, 633, 629, 619
See application file for complete search history.

(56) References Cited

U.S. PATENT DOCUMENTS

| | | | |
|---|---|---|---|
| 2006/0022214 A1 * | 2/2006 | Morgan et al. | 257/99 |
| 2008/0259590 A1 * | 10/2008 | De Goederen - Oei | 362/85 |
| 2009/0021599 A1 | 1/2009 | Matsubara | |

FOREIGN PATENT DOCUMENTS

| | | |
|---|---|---|
| WO | 2006100650 A2 | 9/2006 |
| WO | 2008078286 A1 | 7/2008 |

(Continued)

OTHER PUBLICATIONS

Rodelyn B. Cañizares; "GSM Based Lighting Control System Using Microcontroller" EE 199 Research proposal, B.S. Electrical Engineering.

(Continued)

*Primary Examiner* — Minh D A
(74) *Attorney, Agent, or Firm* — Meenakshy Chakravorty

(57) ABSTRACT

The invention provides a user interaction system (100) and a method of controlling a lighting system. The user interaction system (100) comprises a display (106), a means for receiving a location indication (102), a location identification means (104) and an overlay image creator (108). The display (106) displays a subarea image and an overlay image. The subarea image is an image of a specific subarea of the environment. The location identification means (104) detects which specific location in the environment is indicated by the location indication. The overlay image creator (108) generates the overlay image. The overlay image comprises information related to a lighting effect which is obtainable by the lighting system at the specific location. The obtainable effect is an effect of at least two controllable light sources of the lighting system. The information which is related to the obtainable lighting effect is based on a lighting system model (110) which represents effects that are obtainable in the environment by controllable light sources of the lighting system.

11 Claims, 7 Drawing Sheets

(51) Int. Cl.
*G06F 3/01* (2006.01)
*G06T 11/60* (2006.01)

(56) References Cited

FOREIGN PATENT DOCUMENTS

| WO | 2008142603 | A2 | 11/2008 |
|---|---|---|---|
| WO | 2009004531 | A1 | 1/2009 |
| WO | 2009004586 | A1 | 1/2009 |
| WO | 2010004488 | A1 | 1/2010 |
| WO | 2010035192 | A1 | 4/2010 |
| WO | 2010079400 | A1 | 7/2010 |
| WO | 2011073933 | A2 | 6/2011 |
| WO | 2011092609 | A1 | 8/2011 |

OTHER PUBLICATIONS

The HomeRemote Wireless Home Automation System, Hawking Technologies, 2007. www.homeremote.net.
The HomeRemote Wireless Home Automation System, Hawking Technologies, 2007. www.homeremote.net.

* cited by examiner

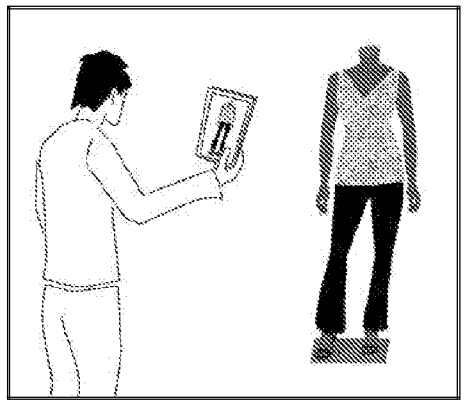
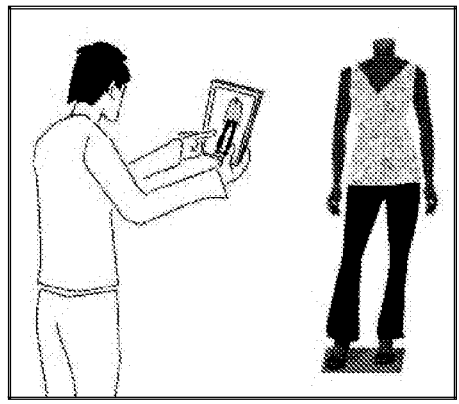
FIG. 3a          FIG. 3b
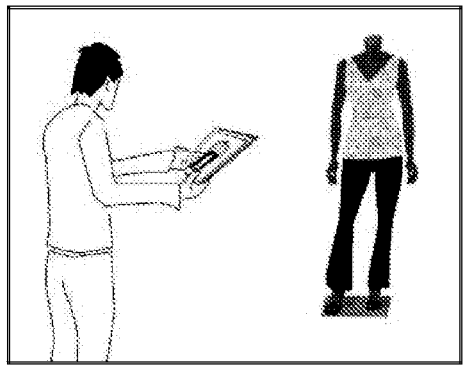
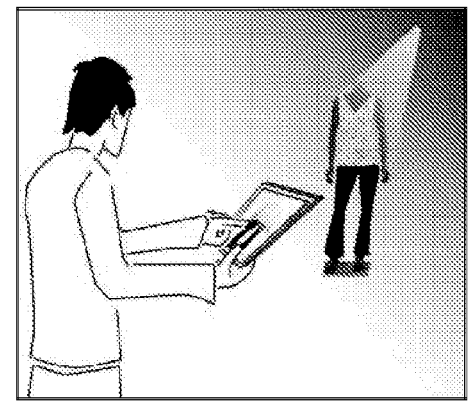
FIG. 3c          FIG. 3d

METHOD AND A USER INTERACTION SYSTEM FOR CONTROLLING A LIGHTING SYSTEM, A PORTABLE ELECTRONIC DEVICE AND A COMPUTER PROGRAM PRODUCT

FIELD OF THE INVENTION

The invention relates to user interaction systems for controlling lighting systems.

BACKGROUND OF THE INVENTION

Published patent application WO 2010/079400 discloses a control system for controlling one or more light sources. The system comprises an image sensor array for obtaining a scene image of a scene. The light emitted by the light sources comprises for each one of the light sources a unique code. The codes are detected by the system. In this way the system obtains knowledge about the available light sources in the environment and a footprint of each one of the light sources. The system presents the scene image to a user on a display and accompanies the scene image with a control image in which control items are shown. The control items are related to the recognized light sources in the scene and the user may select via the respective control items a specific operational mode for the respective light sources. The scene image may be updated to show the result of the controlling of the light sources. In an embodiment, the user may select a zone in the scene image and provide a desired light effect for the selected zone. The system uses an intelligent mapping algorithm to control the light devices to optimally render the requested light effect.

When the user provides the system of the cited art with an effect, it is not a priori clear for the user whether this effect is obtainable. Thus, with the system of the cited art it may happen that the user requests the effect for a specific zone, and that the effect is not obtainable because of limited capabilities of the lighting system. The system of the cited art only provides feedback to the user via updating the scene image and/or controlling the light sources in the real scene and this feedback shows whether the requested lighting effect is obtainable or not. This is not user-friendly.

SUMMARY OF THE INVENTION

An object of the invention is to provide a more user-friendly user interaction system for controlling a lighting system.

A first aspect of the invention provides a user interaction system as claimed in claim 1. A second aspect of the invention provides a portable electronic device as claimed in claim 12. Advantageous embodiments are defined in the dependent claims.

A user interaction system in accordance with the first aspect of the invention comprises a display, a means for receiving a location indication, a location identification means and an overlay image creator. The display displays a subarea image and an overlay image. The subarea image is an image of a specific subarea of the environment. The location identification means detects which specific location in the environment is indicated by the location indication. The overlay image creator generates the overlay image. The overlay image comprises information related to a lighting effect which is obtainable by the lighting system at the specific location. The obtainable effect is an effect of at least two controllable light sources of the lighting system. The information which is related to the obtainable lighting effect is based on a lighting system model which represents effects that are obtainable in the environment by controllable light sources of the lighting system.

The user interaction system provides the user information about the possible lighting effect that may be obtained at the specific location which is indicated by the location indication. This is user-friendly because the user knows a priori, before providing input related to a desired lighting effect, what effects may be obtainable for the specific location. Therefore, the user does not have to discover through trial-and-error whether the effect he has in mind is obtainable. Thus, the user will not select an unobtainable effect and will not be disappointed by the lighting system. Lighting systems become much more complex and a surface or an area of the environment is often lit by a plurality of controllable light sources and, thus, the lighting effect is the combination of a plurality of lighting effects of individual controllable light sources. It is to be noted that the at least two controllable light sources which contribute to the obtainable lighting effect have to emit light to obtain the obtainable lighting effect. Especially the more intensive use of individually controllable light sources like, for example, individually controllable Light Emitting Diodes, makes it much more difficult for users to assess which effects are obtainable in specific areas. The system is capable of analyzing the lighting effects of a plurality of controllable light sources on the basis of the lighting system model and translates the lighting effects of controllable individual light sources to lighting effects for the specific location. Thus, the system performs the translation from "what are the capabilities of the lighting system" to "which effect is obtainable at the indicated location". As a result, the user needs to have less knowledge about the functioning of lighting systems in general, and the lighting system of the environment in particular.

The indicated location is a location in the subarea image or the indicated location is a location in the environment. If the indicated location is a location in the subarea image, the location identification means has to detect which specific location in the environment matches with the indicated location in the subarea image. If the indicated location is indicated in the environment, the location identification means has to detect which specific location has been indicated. The location indication may be a point in the subarea image or a point in the environment, and the location indication may be an indicated area in the subarea image or an indicated area in the environment.

A further advantage of the system is that the user need not necessarily be present in the environment. The particular moment in time when the subarea image was obtained may be a moment in time that does not relate to the moment in time at which the user indicates a location and receives feedback with respect to the obtainable lighting effects. For example, an image of the subarea of the environment may be stored in a database together with the information of the lighting system and information of the environment. Or, in another example, a device may comprises the system and a camera for obtaining the subarea image, and after obtaining the subarea image the device may be relocated to another room and/or the user may move the device to a more comfortable position before providing the user input and receiving information about the obtainable effect.

The subarea image is an image of the subarea. The image may be a schematic drawing of the subarea of the environment or the image may be a recording of the subarea of the environment, for example, the image may be a photograph of the subarea taken at a particular moment in time.

It is to be noted that the display may present the subarea image without the overlay image, for example, before the location indication is received. If the overlay image is generated the display presents the subarea image and the overlay image. Further, the lighting system model may be obtained via known technologies, such as for example the so-termed darkroom calibration, or technologies which are related to the disclosure of the patent application cited in the background of the art section. In patent application WO 2010/079400, the light sources emit coded light and the system of the patent application uses an image sensor to detect the footprints of the light sources and to detect the identification codes of the light sources. In another embodiment, the lighting system model was composed by a person, for example a technician, who installed the lighting system in the environment.

In an embodiment, the means for receiving a location indication is a user-input means for receiving user-input comprising the location indication. It is more user-friendly if the user selects the location indication himself. The system then provides the obtainable effect for a location of which the user wants to know the obtainable effect.

In an embodiment, the obtainable effect is at least one of: the light intensity may locally be increased or decreased, the locally obtainable light colors are a specific subspace of a color space, the light intensity may globally be increased or decreased, the obtainable light colors in an area at and around the specific location are a specific subspace of the color space, the contrast may be increased or decreased in an area at and around the specific location, a colder or warmer color is obtainable, the color temperature may be increased or decreased, and an effect of a redirectable controllable light source may be moved. It is to be noted that the obtainable effect may relate to the specific location only, when for example at the specific location the intensity may be increased or decreased, or the obtainable effect may relate to the specific location and an area close to the specific location, when for example the intensity may be increased or decreased globally. In the context of obtainable effect, globally is to be taken to mean: at the specific location and at an area around the specific location.

In an embodiment, the input means are further configured for receiving a desired lighting effect or a desired lighting effect change. The received desired lighting effect and the received desired lighting effect change are received for the specific location. In other words, after providing, via the user-input means, a location indication and receiving feedback from the system about the obtainable effects, the user provides input wherein the user expresses an expectation with respect to a lighting effect at the specific location. The desired effect or effect change may relate to locally changing the intensity and/or the color of the light, or changing the intensity and/or the color of the light in an area at and around the specific area.

In a further embodiment, the user interaction system further comprises a light effect controller to generate a control signal for a controllable light source of the lighting system to optimally obtain the desired lighting effect or the desired lighting effect change at the specific location. The generation of the control signals is based on the lighting system model. The lighting system model further comprises information concerning the relation between values of control signals for the controllable light sources and a response of the respective controllable light sources when receiving the control signals. The lighting model may further comprise the relations between the control signals that the controllable light sources of the lighting system may receive and how the control signals change the operation of controllable light sources. Thus, the lighting model comprises enough information to allow the system to determine how a lighting effect in the environment changes if specific control signals are provided to one or more controllable light sources of the lighting system. The user provides the desired light effect or the desired light effect change and on the basis of the information in the model the light effect controller generates at least one control signal for a controllable light source of the lighting system such that the desired light effect or the desired light effect change is obtained as much as possible by the lighting system if the controllable light source of the lighting system receives the at least one control signal. Thus, the user does not need to have a lot of knowledge about the lighting system and about how the controllable light sources of the lighting system have to be controlled.

It is to be noted that it might be possible that the desired light effect or the desired light effect change is still not completely obtainable. The light effect controller is configured to generate the control signal such that the desired effect or the desired effect change may be obtained as much as possible. The at least one control signal is not necessarily immediately provided to the lighting system. In subsequent embodiments the at least one control signal is utilized for different purposes.

Several parameters of the controllable light source may be controlled via the control signal. Examples are intensity of the emitted light, color of the emitted light, light emission angle, or in the case of redirectable light sources, for example, location of the effect of the redirectable light source, exact location of the light source, and direction in which a light beam is emitted. Other parameters which may be comprised in the control signal are for example time-dependent parameters, like for example "emit at a specific intensity during a specific interval of time".

In another embodiment, the overlay image creator is further configured to generate the overlay image, which comprises information which presents the changed operation of the controllable light source of the lighting system in accordance with the generated control signal. Thus, in other words, the overlay image is a virtual addition to the reality of the subarea image, which shows the user what the subarea is going to look like when the lighting system is controlled with the control signal. This allows the user to evaluate the lighting situation that may arise from controlling the lighting system with the generated control signal, even before the lighting system is controlled with the control signal. It is convenient for the user to evaluate the controlling of the lighting system in a virtual environment, because it allows the design of a lighting control pattern without using the lighting system and, thus, the lighting system is not unnecessarily occupied for designing the lighting control pattern.

In an embodiment, the overlay image creator is configured to generate the overlay image which comprises virtual objects which are positioned in the subarea of the environment and which are virtually lit by the controllable light sources of the lighting system in accordance with the control signal.

In a further embodiment, the overlay image creator is configured to generate the overlay image which comprises feedback about the feasibility of the desired lighting effect or the desired lighting effect change. As mentioned before, the light effect controller may be unable to control the lighting system such that the desired light effect or the desired light effect change is obtained, because of limitations of the lighting system. The overlay image may provide feedback to the user, which indicates to which extent the desired light effect is obtainable and to which extent the desired light effect change is obtainable, in other words, the feedback presents how feasible the desired light effect or light effect change is, given the lighting system present in the environment. In general this is perceived as user-friendly because it makes the user aware of limitations of the lighting system and the user is not unexpectedly disappointed if the lighting system is controlled with the control signal.

In another embodiment, the user interaction system further comprises an output means to provide the control signal to the lighting system. When providing the control signal to the lighting system, the lighting system may not only be controlled in a virtual environment, but also in the real environment. Thus, the system is a user-friendly system which may be used to evaluate obtainable effects of the lighting system in a virtual environment by means of the overlay image, and which may be used to control the lighting system in the real environment.

In an embodiment, the overlay image creator is further configured for generating the overlay image comprising information related to one or more controllable light sources of the lighting system. The information of a specific controllable light source is at least one of: position of the specific light source, direction in which the light beam of the specific light source can be emitted, footprint of the light beam of the specific light source, colors that can be emitted by the specific light source, intensities that can be emitted by the specific light source, movement options of the specific light source, relation between the obtainable effect and the specific light source. Providing additional information with respect to the one or more light sources of the lighting system and/or their capabilities, results in a more user-friendly system because the additional information makes the user more aware of the functioning of the lighting system and its capabilities. The additional information is for example related to the current position and current operation of the light sources, i.e., where are the light sources located and how do the light sources operate to obtain the lighting situation which is recorded in the subarea image. In another embodiment, the additional information is, for example, related to the capabilities of the light sources of the lighting system, which are not necessarily being operated at the particular moment in time when the subarea image is recorded. In an example, possible movements of a redirectable spot are presented, the possible subspace of a color space of the light source is presented, as well as the possible light intensities, the possible light emission angles, etc.

In another embodiment, the user interaction system further comprises a camera to obtain a camera image and the display is further configured to display the camera image. The embodiment allows browsing the environment via the control device. The camera obtains one or more successive camera images and the display presents the one or more camera images, and consequently the user interaction system is a means for the user to view the environment. It is especially user-friendly to show the camera images on the display when the camera has a different viewing angle than the user, and the camera may for example be capable of zooming to details which are difficult to recognize for a user.

As discussed previously, the subarea image may also be presented on the display, either together with the overlay image, or initially without the overlay image. The camera image may be presented independently of the subarea image and/or independently of the overlay image, or together with the subarea image and/or the overlay image. If the camera image and the subarea image are presented simultaneously, this may be done in an overlay manner, or the two images may be presented next to each other. In an embodiment, the overlay image is continuously generated and presented together with the camera image.

In a further embodiment, the user-input means is further configured for receiving user input indicating at a particular moment in time that the camera image is the subarea image. While browsing with the user interaction system, the user may, at the particular moment in time, decide that the camera image which is presented on the display is the subarea image. In other words, when the user provides the input that the camera image is the subarea image, the user indicates to the user interaction system that he wants to receive information with respect to an obtainable light effect in the camera image at that particular moment in time.

In yet another embodiment, the camera comprises at least one of: means to detect a location of the camera, means to detect a direction in which the camera is directed, a tilt sensor to detect the tilt of the camera, and means to detect the angle of view of the camera. The location identification means is configured to detect which specific subarea of the environment is imaged in the subarea image on the basis of at least one of: the detected location of the camera, the detected direction, the detected tilt and the detected angle of view. The location identification means is configured to base the detection of the specific location on the detected specific subarea.

Especially in cases where the location indication is provided to the user interaction system as a position in the subarea image, the user interaction system has to know which specific subarea is recorded in the subarea, so that the location identification means is capable of detecting which specific location in the environment matches with the location indication. The embodiment provides means to detect, while obtaining a recording of the subarea via the camera, to which part of the environment the camera is directed and which part of the environment is recorded by the camera. This is very user-friendly because the user interaction system is capable of automatically detecting which specific location is indicated in the subarea image, without requiring additional user interaction.

The location identification means has also knowledge about the environment. This may be pre-programmed in the location identification means in the form of a model of the environment, or the location identification means is capable of deducting the model of the environment from the subarea image, or the location identification means receives, together with the lighting system model, a model of the environment.

In another embodiment, the subarea image is accompanied with information which expresses which specific subarea of the environment is imaged in the subarea image.

In an embodiment, the camera comprises at least one of: means to detect a location of the camera, means to detect a direction in which the camera is directed, a tilt sensor to detect the tilt of the camera, and means to detect the angle of view of the camera. The user-input means is configured to base the location indication on at least one of: the detected location of the camera, the detected direction, the detected tilt and the detected angle of view. In the embodiment, the camera, together with the display, is the detection means of the camera, as well as the user-input means, i.e. a means to point to a location in the environment and thereby provide a location indication. One may for example browse with the camera, and finally direct the camera to a subarea and zoom in to the centre of the subarea to provide the location indication. Subsequently, the overlay image creator may generate the overlay image such that the user may receive information about one or more obtainable lighting effects at the indicated location.

According to a second aspect of the invention, a portable electronic device is provided which comprises the user interaction system according to one of the embodiments of the user interaction system according to the first aspect of the invention. The portable electronic device is for example a mobile phone or a portable computer.

According to a third aspect of the invention, a method of controlling a lighting system for lighting an environment is provided. The method comprises the steps of i) displaying a subarea image being an image of a specific subarea of the environment, ii) receiving user input comprising a location indication, iii) detecting which specific location in the environment is indicated by the location indication, iv) generating an overlay image comprising information related to a lighting effect which is obtainable by the lighting system at the specific location, the obtainable lighting effect being an effect of at least two controllable light sources of the lighting system, and the information related to the obtainable lighting effect being based on a lighting system model representing the effects obtainable in the environment by controllable light sources of the lighting system, v) displaying the subarea image and the overlay image.

In an embodiment, the method starts again with the step of displaying a subarea image after performing all the steps of the method.

According to a fourth aspect of the invention, a computer program product is provided which comprises instructions for causing a processor system to perform the method according to the third aspect of the invention.

The portable electronic device, the method of controlling the lighting system and the computer program product provide the same benefits as the user interaction system according to the first aspect of the invention and have similar embodiments with similar effects as the corresponding embodiments of the system.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the method, the portable device, and/or of the computer program product, which correspond to the described modifications and variations of the system, can be carried out by a person skilled in the art on the basis of the present description.

Figure 1A:
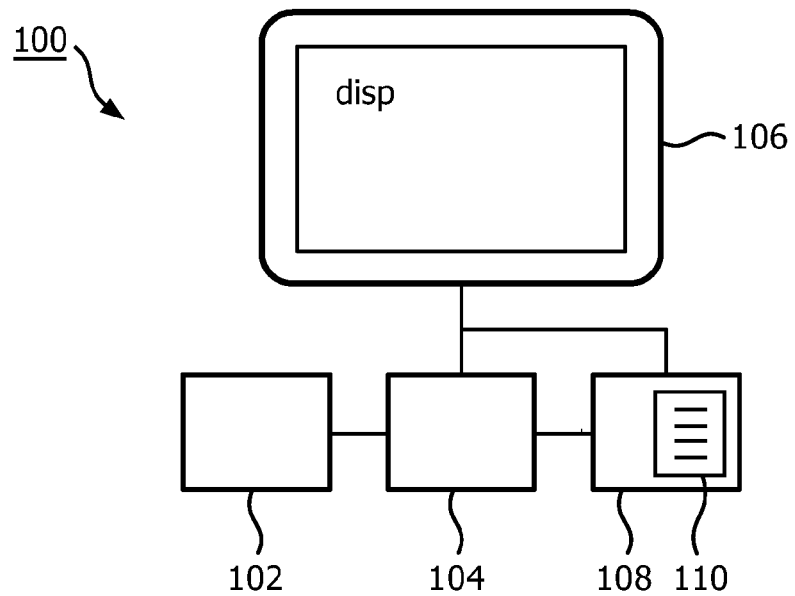
FIG. 1a schematically shows a first embodiment of the user interaction system according to the first aspect of the invention, FIG. 1b schematically shows a display presenting a subarea image and an overlay image, FIG. 2 schematically shows a second embodiment of the user interaction system, FIG. 3 schematically shows a typical use-case of the user interaction system, FIG. 4 schematically shows another embodiment of the display presenting the subarea image and the overlay image, FIG. 5 schematically shows a lighting system model, FIG. 6 schematically shows another embodiment of the display presenting the subarea image as a schematic drawing of a room.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION OF EMBODIMENTS

Figure 1B:
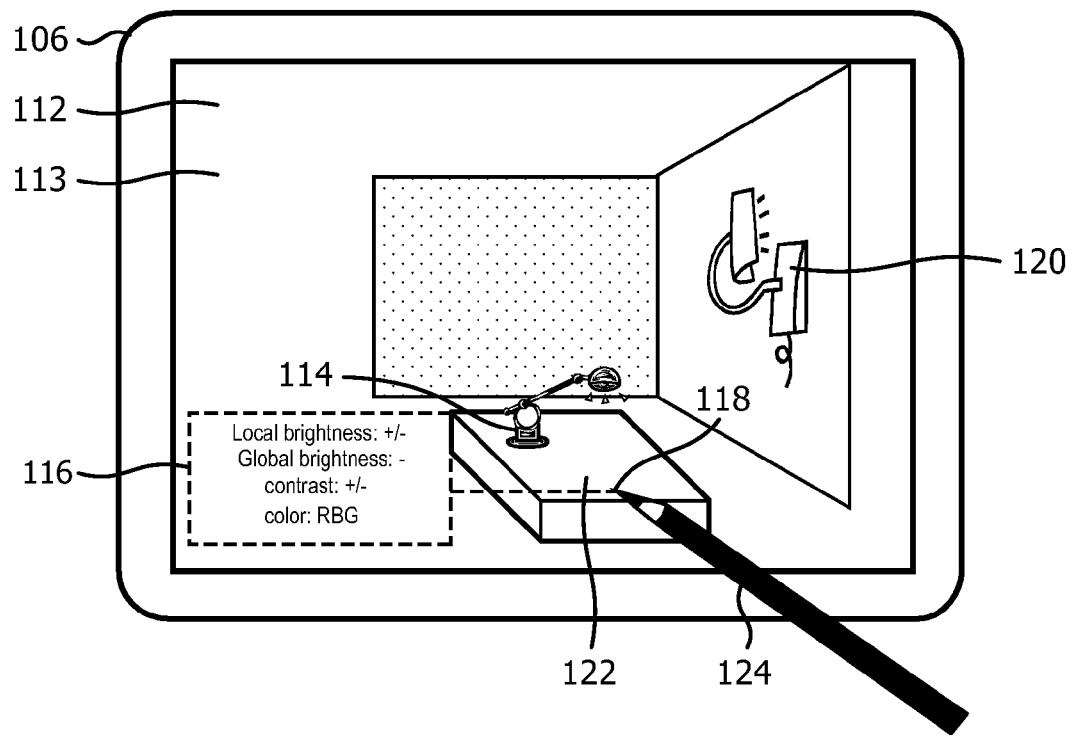

A first embodiment of a user interaction system 100 according to the first aspect of the invention is shown in FIG. 1a. By means of the user interaction system 100, a lighting system for lighting an environment may be controlled. The user interaction system 100 comprises a display 106, an input means 102, a location identification means 104 and an overlay image creator 108. The display is capable of displaying a subarea image 112 and an overlay image 113, which are shown in FIG. 1b. The subarea image 112 may be displayed without the overlay image 113 and together with the overlay image 113. The subarea image 112 is a recording of a specific subarea of the environment and the subarea image 112 is recorded at a specific moment in time. The user-input means 102 is for receiving user input. The user input comprises a location indication 118. The location indication 118 may initially relate to a point or location in the subarea image 112 or may initially relate to a point or location in the environment. The location identification means 104 detects which specific location in the environment is indicated by the location indication 118. The overlay image creator 108 generates the overlay image 113. The overlay image 113 comprises information 116 related to a lighting effect which is obtainable by the lighting system at the specific location in the environment. The obtainable lighting effect is an effect of at least two light sources. In other words, at least two light sources contribute to the obtainable lighting effect. The information which is related to the obtainable lighting effect is based on a lighting system model 110. The overlay image creator 108 comprises the lighting system model 110 in an internal storage or the overlay image creator 108 is capable of accessing the lighting system model 110, for example, via a network connection. The lighting system model 110 represents the effects that are obtainable in the environment by light sources of the lighting system. In other words, the lighting system model comprises information about which lighting effects are obtainable where in the environment and by which light sources of the lighting system.

The user interaction system 100 presents on the display 106 the subarea image 112, which is shown in FIG. 1b. The subarea image 112 is a recording of the specific subarea of the environment. Two walls of the subarea are imaged in the subarea image 112. A first luminaire 114 is present on a small table 122 and a second luminaire 120 is present on one of the walls. The first luminaire 114 is used to locally light the small table 122. The second luminaire 120 is used to globally light the subspace. Therefore, the total amount of light which falls on the small table 122 depends on light emitted by the first luminaire 114 and the second luminaire 120.

The display 106 may be combined with the input means 102. In the embodiment of FIG. 1b, the input means 102 has a touch-sensitive layer integrated with the display 106, enabling a user to provide user input by touching the display 106. In the example of FIG. 1b, a stylus 124 is used by the user to provide a location indication 118 to the input means 102. The stylus 124 touches the display 106 at one or more pixels of the top surface of the small table 122. In other embodiments, the input means is not necessarily a touch screen, but may comprise a keyboard, or a mouse, or other means to receive input from a user.

The location identification means 104 subsequently detects which specific location in the subarea is indicated by the location indication 118. The location identification means 104 has, for example, a model of the environment and knows which subarea of the environment is imaged in the subarea image 112. By mapping the position of the pixels which are touched with the stylus 124 to a surface in the model of the environment, the location identification means 104 is capable of detecting that the location indication 118 matches with a specific location on the top surface of the small table 122. In another embodiment, the location identification is an indication area in the subarea image. The user input may be a polygon that is drawn around the indication area.

The overlay image creator 108 uses the lighting system model 110 to generate the overlay image 113. The overlay image 113 is presented on the display 106 together with the subarea image 112 in an overlay manner. The overlay image 113 comprises information 116 which relates to the obtainable lighting effects at the specific location. In FIG. 1b it is seen that the information 116 is presented in the form of text, however, the information 116 may also be presented in a graphical format. In the example of FIG. 1b, four different characteristics of obtainable lighting effects at the specific location are presented. In another embodiment, only one characteristic of a lighting effect for the specific location is presented. The information 116 shows the user that the local brightness, which is the brightness at the specific location, may be increased and decreased. The global brightness, which relates also to the brightness in an area around the specific location, can only be decreased. The contrast, which is related to the ratio between local spot intensity and global ambient intensity, can be decreased and increased. And the available lighting colors at the specific location are a plurality of combinations of the colors red, green and blue.

Figure 2:
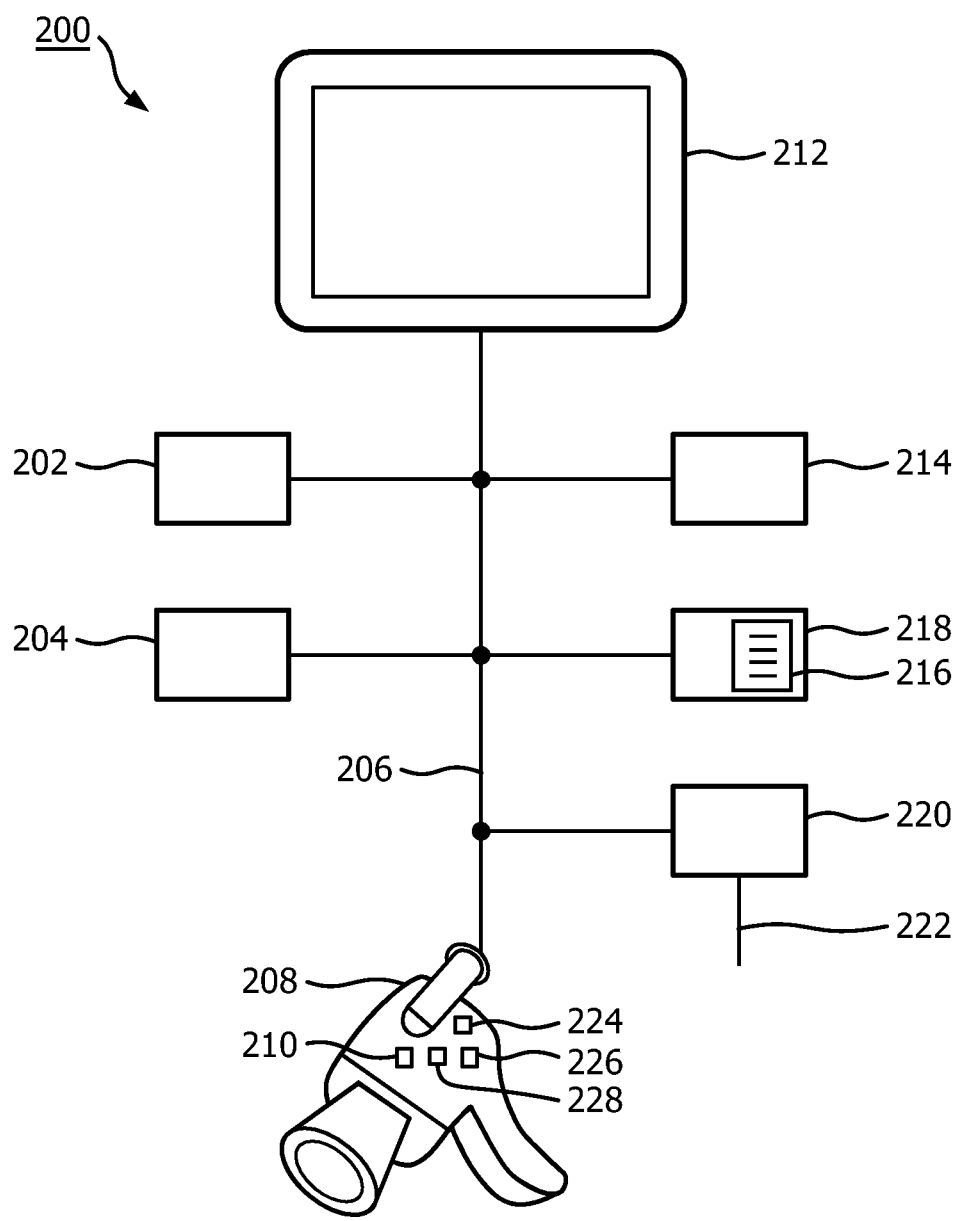

FIG. 2 shows another embodiment of a user interaction system 200 according to the first aspect of the invention. The user interaction system 200 comprises a display 212, an input means 202, a location identification means 204, an overlay image creator 214, a light effect controller 218, an output means 220 and a camera 208. The user interaction system 200 further comprises a communication bus 206, which is used by the different components of the system to communicate with each other. The display 212 displays a subarea image, an overlay image and/or a camera image. The input means 202 receives user input. The user input comprises a location indication. The location identification means 204 detects which specific location in the environment is indicated by the location indication. The overlay image creator 214 generates the overlay image which comprises information with respect to an obtainable lighting effect at the specific location in the environment. To create the overlay image a lighting system model 216 is used by the overlay image creator. In the shown embodiment, the lighting system model 216 is stored in the lighting effect controller 218 and is accessed by the overlay image creator via the communication bus 206.

The user-input means 202 may also receive user input with respect to a desired lighting effect for the specific location which was indicated with the location indication. Instead of a desired lighting effect, a desired effect change may be provided as well, which means that the provided user input is a desired change of the lighting situation which is imaged in the subarea image. If the provided lighting effect change is, for example, "locally higher brightness", the brightness, as imaged in the subarea image, of the specific location has to increase locally. The light effect controller 218 uses the desired lighting effect or the desired lighting effect change to generate at least one control signal for at least one light source of the lighting system such that, if the light sources of the lighting system emit light according to the at least one control signal, the desired lighting effect or the desired lighting effect change is optimally obtained at the specific location. Optimally means in this context "as much as possible" in view of the limitations of the lighting system. It is to be noted that the user is first informed about the possible lighting effects and therefore it is expected that the user provides a desired lighting effect or a desired lighting effect change which is obtainable by the lighting system. The light effect controller 218 stores the lighting system model 216, which does not only contain information about which light effects are obtainable by the light sources of the lighting system, but also comprises information which links the obtainable lighting effects with control signals to control the operation of the light sources to obtain the lighting effects. It is to be noted that the control signal may comprise information with respect to every controllable characteristic of the light sources of the lighting system. For example, if the light emission of the light sources is controllable, the control signal may comprise control information to emit at a specific light intensity. In other examples, the color of the light, the light emission angle or, for example, the position of the light sources is controllable.

The generated control signal may be provided to the lighting system via the output means 220. An output 222 of the output means 220 is for example a DMX-bus, which is a communication bus system which is used by some lighting systems to communicate control parameters to the light sources. The output 222 may also employ another communication technology, like a wireless Ethernet, Bluetooth, Zig-Bee or Z-Wave connection.

The control signal is not necessarily used for controlling the lighting system. In an embodiment, the overlay image creator 214 is capable of generating an overlay image which would also present the changed operation of the light sources of the lighting system if the lighting system were controlled with the control signal. In order to generate the overlay image, the overlay image creator 214 accesses the lighting system model 216 to render the lighting effect, which is the result of the control signal. Such an overlay image is presented together with the subarea image on the display 212 and the combined view virtually presents the effects of the controlling.

In an embodiment, the overlay image creator 214 is further capable of generating an overlay image which presents information with respect to the feasibility of the desired lighting effect or the desired lighting effect change. In other words, if the desired lighting effect or the desired lighting effect change is not completely obtainable by the lighting system because of limitations in the lighting system, the overlay image may communicate to the user that not the complete lighting effect may be obtained and the overlay image may possibly communicate to which extent the lighting effect may be obtained.

The user interaction system 200 further comprises a camera 208. The camera obtains a camera image of a part of the environment which comprises the lighting system. The display 212 may present the camera image. As such the user interaction system 200 may be used to browse the environment to find a subarea in which the lighting system has to be controlled. The user-input means 202 may also receive specific user-input which indicates that at the particular moment of providing the specific user-input the camera image is the subarea image. Thus, the browsing and the provision of the specific user-input may be used by the user of the user interaction system 200 to record the subarea image. In an embodiment, after obtaining the subarea image, the camera image is not anymore presented on the display 212 and the camera image is replaced by the subarea image. In other words, while browsing, the camera image is frozen for controlling the lighting system with respect to one or more locations imaged in the frozen camera image.

The camera 208 may comprise at least one of the subsequent means: means 210 to detect a location of the camera, means 224 to detect a direction in which the camera 208 is directed for recording the camera image, a tilt sensor 226 and means 228 to detect the angle of view of the camera 208. The means 210 to detect the location of the camera 208 is, for example, a GPS sensor, or a sensor which is capable of determining the location of the camera 208 with respect to a known fixed point in the environment. The means 224 to detect a direction in which the camera 208 is directed is, for example, an electronic compass. The means 228 to detect the angle of view is, for example, the zoom controller of the camera 208. The different detecting sensors in the camera 208 may be used for different purposes.

In an embodiment, the camera 208 is a fixed camera whose direction and tilt may be controlled. The location of such a camera is known, and the tilt and the direction correspond to the controlled value, and it is assumed that the angle of view is fixed.

In an embodiment, the detected location of the camera 208, the detected recording direction, the detected tilt and/or the detected angle of view are used by the location identification means 204 to determine which specific subarea of the environment is imaged in the subarea image. The location identification means 204 has, for example, a model of the environment which is combined with the detected parameters to determine which specific subarea is imaged. Alternatively, trigonometry is used to detect which specific subarea is imaged in the subarea image.

In another embodiment, the detected location of the camera 208, the detected recording direction, the detected tilt and/or the detected angle of view are used by the input means to detect which location indication the user is providing as user-input. The fact that the user is directing the camera 208 to a specific point in the environment may be interpreted by the user-input means 202 as the user providing the user-input of the location indication. For example, the center point of the camera image may be regarded as the location indication if the user keeps the camera 208 in a fixed position for a predetermined interval of time. Or, if the user zooms in to a specific location in the environment, this may be interpreted by the input means 202 as the user providing the user input of the location indication. In an embodiment, a mobile phone, which is provided with a video camera, comprises the user interaction system of FIG. 2, wherein the camera 208 of the user interaction system is the camera of the mobile phone. The user browses through the environment and at a particular moment in time a button is pressed such that the user indicates that the camera image at the particular moment in time is the subarea image. Subsequently, the user zooms, with the camera 208, to a specific location of the subarea of the environment and at the moment in time that the maximum zoom is reached, the user-input means 202 considers the location that is imaged in the zoom image as the location indication. In another embodiment, the user does not have to zoom towards the location which is the location indication, but the user has to align the center of the camera image with the location indication and keep the camera 208 in a fixed position for a predetermined interval of time.

In another embodiment, the location identification means 204 comprises 3D model generation means for generating a model of the subarea through analyzing the subarea image. The determined specific subarea is subsequently used to detect which specific location is indicated with the location indication.

In yet another embodiment, markers are available in the environment. Some of the markers may be visible in the subarea image and the visible markers are recognized by the location identification means 204 to identify which specific subarea of the environment is imaged in the subarea image. The location identification means 204 requires knowledge of available markers and their relation with the environment.

FIG. 3 shows a typical use case of the user interaction system. FIG. 3a shows a mannequin in a shop. The shop is lit by a lighting system. After dressing the mannequin in clothes of the new collection, the shop-assistant gets a portable electronic device having at one side a display and at a side opposite the display a camera. The shop-assistant directs the camera of the portable electronic device towards the mannequin. In FIG. 3b is shown that the shop-assistant provides input to the portable electronic device and the device records the image of the mannequin as the subarea image. In FIG. 3c the shop-assistant moves the portable electronic device to a more comfortable position while the display of the portable electronic device still presents the subarea image. FIG. 3d shows that the shop-assistant selects on the (touch-) screen of the portable electronic device a location for which he likes to control the lighting. The portable electronic device presents, in an overlay image, obtainable effects at the selected location and, subsequently, the shop-assistant provides a desired lighting effect for the selected location. In FIG. 3d is shown that the control signals which are generated by the portable electronic device are immediately provided to the lighting system such that the shop-assistant is able to see in the shop what the effect of the controlling is. In another embodiment, the lighting system of the shop is not immediately controlled and the portable electronic device presents, in the overlay image, the effect of the controlling of the lighting system such that the shop-assistant is able to design the light situation around the mannequin in a virtual environment.

Figure 4:
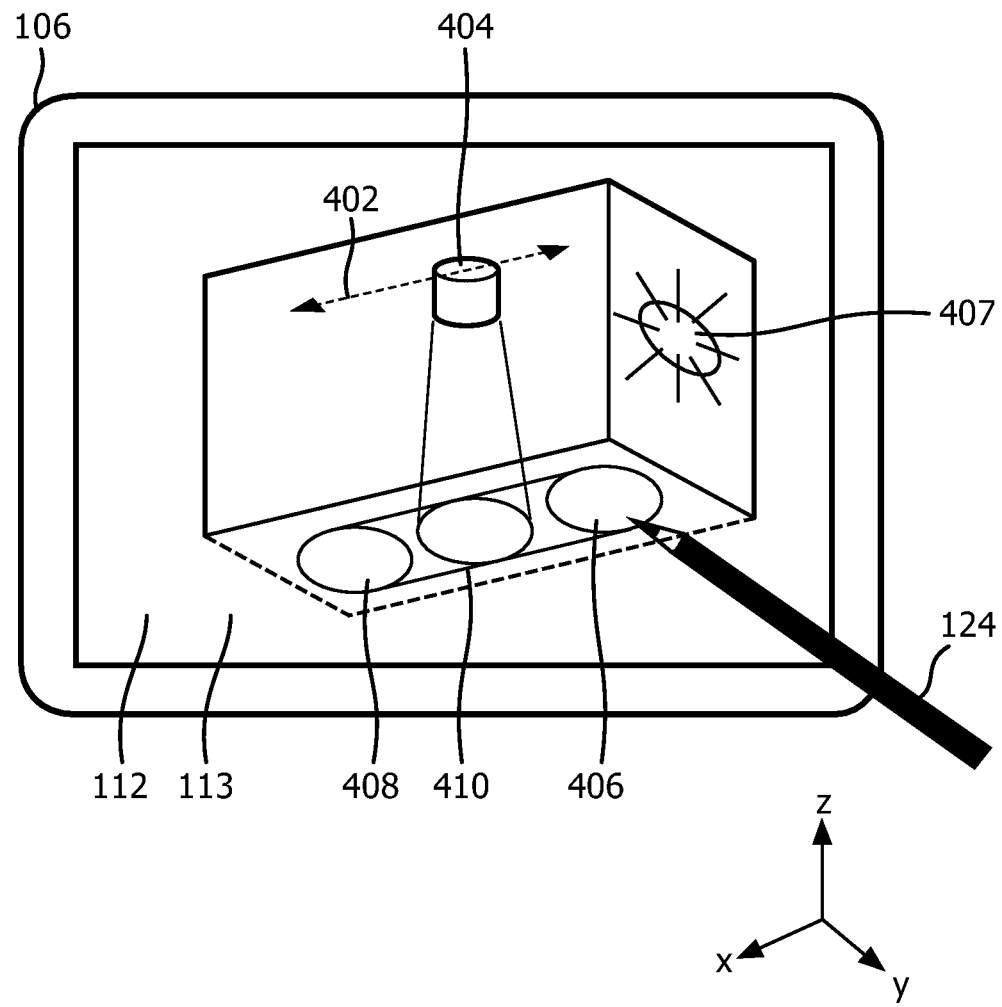

FIG. 4 relates to another embodiment, wherein the lighting system comprises a redirectable luminaire 404 and a fixed luminaire 407. In FIG. 4, the display 106 is shown, which presents the subarea image 112 and the overlay image 113. The overlay image presents the obtainable lighting effects at the location indicated with the stylus 124. In the embodiment of FIG. 4, it has been shown that a relatively bright spot 406 of light may be obtained at the indicated location. The light at the indication location is the sum of the light from the redirectable luminaire 404 and the fixed luminaire 407 which emits light towards the whole environment. The overlay image 113 also presents the relation between the position of the redirectable luminaire 404 and the lighting effects which may be obtained by the redirectable luminaire 404. The redirectable luminaire 404 may be controlled to move along a line 402 shown in the overlay image 113. When the redirectable luminaire 404 moves along line 404, the footprint of the light beam moves along imaged path 410. In the leftmost position, the leftmost footprint 408 is obtained and in the rightmost position the rightmost footprint 406 may be obtained. If the user provides as input that the desired effect is that a bright spot has to be created at the indicated location, the light effect controller generates a control signal indicating that the redirectable luminaire 404 has to move to its rightmost position.

When the user provides input with respect to a desired light effect or a desired light effect change, the user may, in an example, drag the brightest spot over the floor to another position. The brightest spot substantially corresponds to the footprint of the redirectable luminaire 404.

In an embodiment, the redirectable luminaire 404 is rotatable around an x-axis and a y-axis. The direction of the x-axis and the y-axis is indicated at the bottom right end of FIG. 4. The footprint of such a redirectable luminaire may be directed towards the floor or to one of the walls. Thus, the obtainable effect is that a local bright spot may be created almost anywhere in the subspace.

Figure 5:
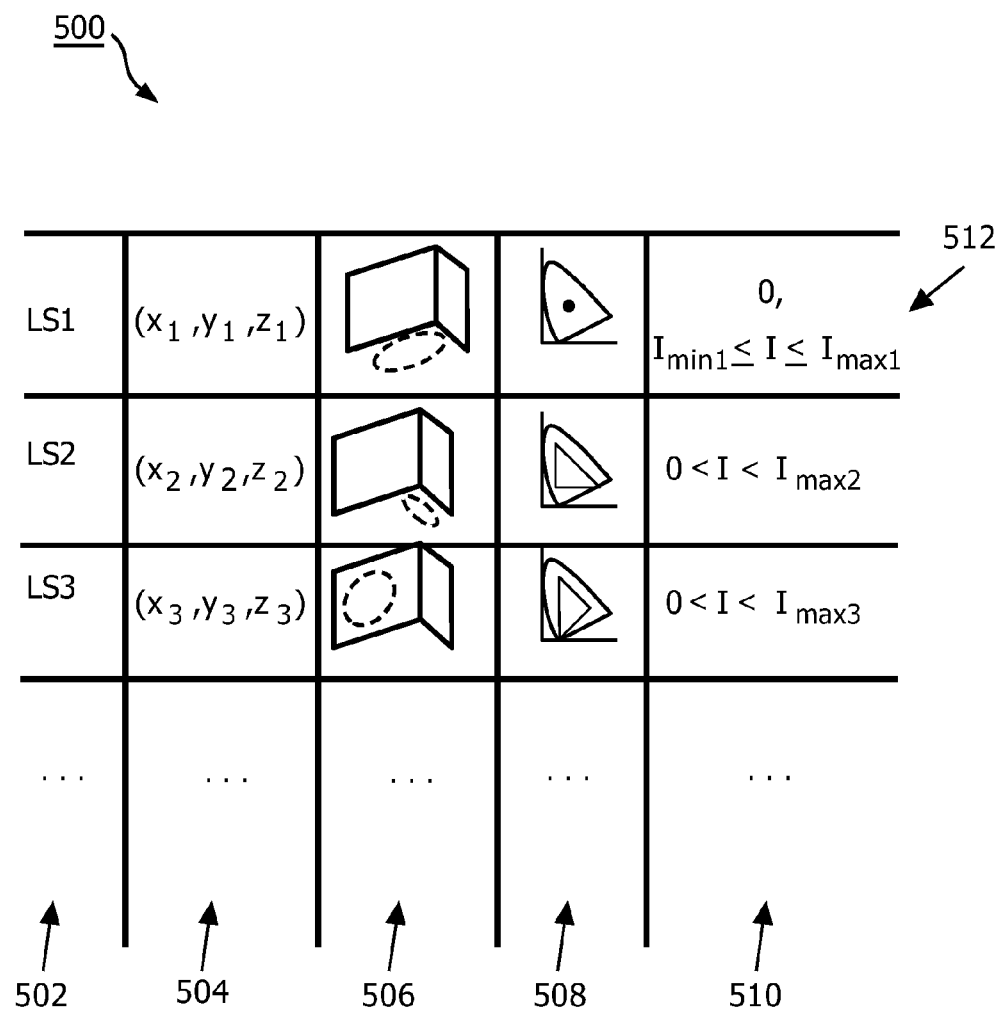

FIG. 5 shows an example of a lighting system model 500. Such a model may be built using known techniques, such as, for example, so-termed darkroom calibration, light planning software, CAD representations, or using a technology that is related to emitting coded light with the light sources and recording and analyzing the emission of coded light. The document that is cited in the background of the art relates to building such a model by using light sources that emit coded light.

The lighting system model 500 is presented in the form of a Table, however, such a model may be stored differently, for example, in a relational database, and the model may be implemented differently, for example, in a light simulation module. The Table comprises in the rows the characteristics of one specific light source. For example, row 512 comprises the parameters of the first light source. In column 502 an identification code of the respective light source is presented, in column 504 the location (within the environment) of the respective light source, in column 506 the footprint of the respective light source, in column 508 the subspace of the CIE XYZ color space wherein light may be emitted by the respective light source, and in column 510 there is stored the light intensity range of the respective light source. As seen in FIG. 5, the first light source, which has the identification code LS1, is located in the environment at a position which is described with coordinates (x1, y1, z1). The first light source has an oval footprint on the floor of the environment, and the color of the emitted light is a point somewhere in the middle of the CIE XYZ color space. Further, the first light source may be switched off, so that no light is emitted, but if the light source is switched on, the emitted light intensity is in between a value $I_{min1}$ and $I_{max1}$. If, in an example, the overlay image creator has to generate an overlay image which presents information with respect to an obtainable light effect at a point close to the rightmost side of the floor, the overlay image creator finds in column 506 of the table 500 that light sources LS1 and LS2 have a footprint at this specific position and thus that the combination of capabilities of light sources LS1 and LS2 determine the obtainable effects. For example, the obtainable light intensities are the sum of the light intensities that may be emitted by light source LS1 and light source LS2.

The model 500 of FIG. 5 is just an example of such a model. More information may be available in the model, such as for example the relation between value control signals that may be received by the light sources and the characteristics of the light that is emitted in response to receiving the control signals. Column 506 may further comprise information with respect to the intensity distribution within the footprint of the light beam of the respective light source when the respective light source emits light at maximum intensity. Further, in the example of FIG. 5, the footprints of the respective light sources are presented in column 506 as a footprint on the floor or the walls of the environment. Light planning software is often also capable of working with virtual planes, and therefore the footprint may also be stored as a footprint on a virtual plane in the environment. Column 508 of the model 500, which comprises the color space obtainable by the respective light source, may also be represented by three color points in the XYZ color space which define the corners of the obtainable color space.

Figure 6:
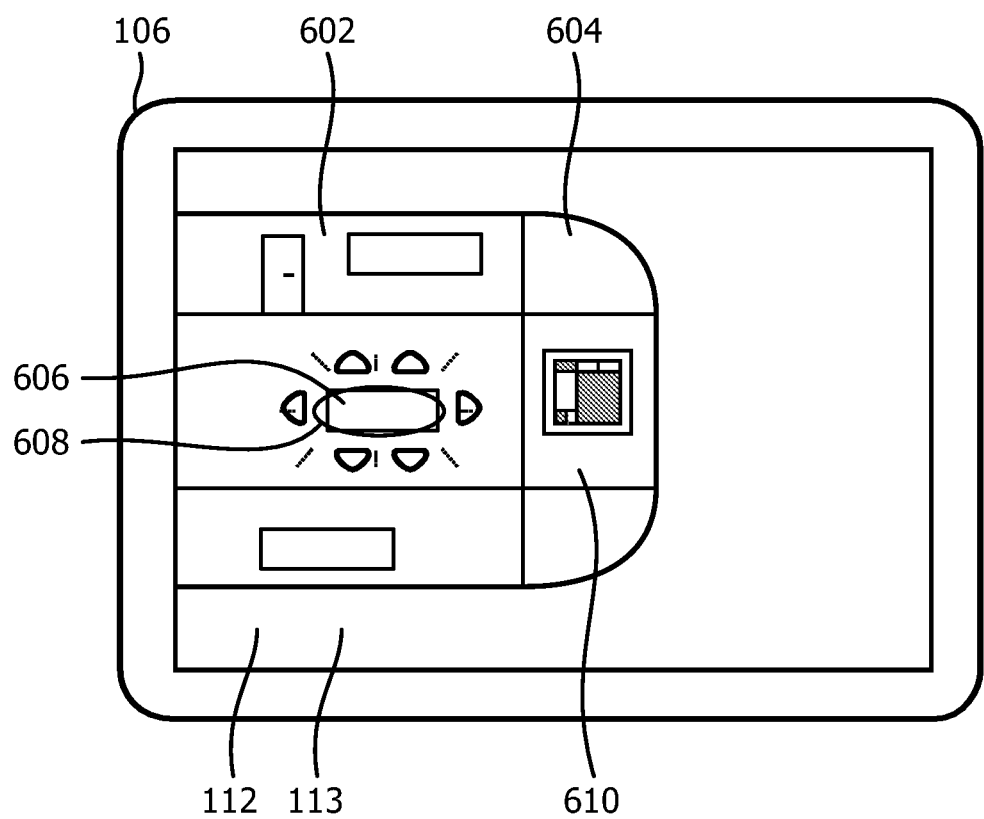

FIG. 6 shows another embodiment wherein the subarea image 112 is a schematic drawing of a room. The subarea image shows, for example, that in an office a meeting table 606 with 6 chairs is placed at the right end of the meeting room. A wall 602 has an entrance door and a reproduction of a famous Mondrian painting is attached to a side-wall 610. Part 604 of the schematic drawing of the room does not correspond to a wall in the environment and is drawn for clarity reasons only. The overlay image 113 presents an obtainable effect 608 on the table 606. The obtainable effect 608 is local light on the table 606.

Figure 7:
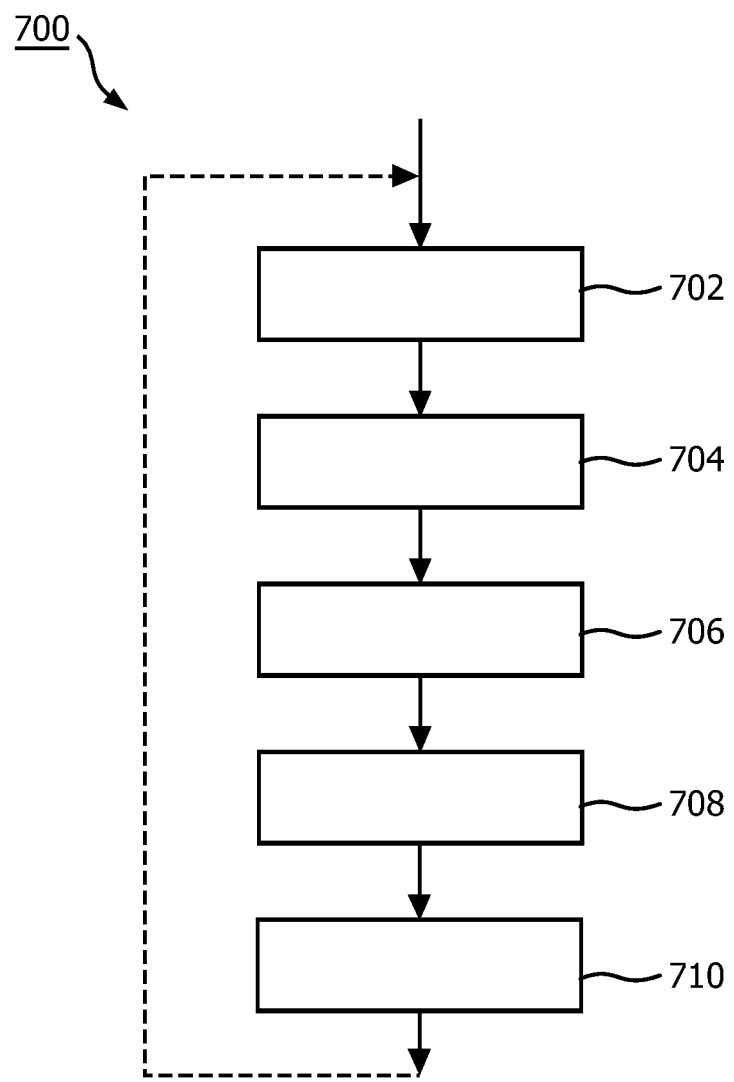
FIG. 7 shows a flowchart of the method according to the third aspect of the invention.

FIG. 7 shows a flowchart of the method 700 according to the third aspect of the invention. In step 702, a subarea image is displayed. The subarea image is an image of a specific subarea of the environment at the particular moment in time. In step 704, user input is received. The user input comprises a location indication. In step 706 it is detected which specific location in the environment is indicated by the location indication. In step 708, an overlay image is generated. The overlay image comprises information related to a lighting effect which is obtainable by the lighting system at the specific location. The obtainable lighting effect is an effect of at least two controllable light sources of the lighting systems. The information related to the obtainable lighting effect is based on a lighting system model representing effects that are obtainable in the environment by controllable light source of the lighting system. In step 710, the subarea image and the overlay image are displayed. In an embodiment, after all the steps of the method have been performed, the method starts again with the step of displaying 702 a subarea image.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A user interaction system for controlling a lighting system for lighting an environment, the user interaction system comprising:
   a display for displaying a subarea image and an overlay image, the subarea image being an image of a specific subarea of the environment,
   a means for receiving a location indication,
   a location identification means for detecting which specific location in the environment is indicated by the location indication,
   an overlay image creator for generating the overlay image comprising information related to a lighting effect which is obtainable by the lighting system at the specific location, the obtainable lighting effect being an effect of at least two controllable light sources of the lighting system, the information related to the obtainable lighting effect being based on a lighting system model representing effects that are obtainable in the environment by controllable light sources of the lighting system, and
   a camera for obtaining a camera image,
   wherein the display is further configured for displaying the camera image and wherein the means for receiving location indication is configured for receiving user input selecting the camera image and indicating that the camera image is the subarea image to be displayed; the camera comprises at least one of: means for detecting a location of the camera, means for detecting a direction in which the camera is directed, a tilt sensor to detect the tilt of the camera, and means for detecting the angle of view of the camera, and wherein the location identification means is configured for detecting which specific subarea of the environment is imaged in the subarea image determined by at least one of: the detected location of the camera, the detected direction, the detected tilt, and the detected angle of view, and wherein the location identification means is configured to determine the specific location on the detected specific subarea.

2. A user interaction system according to claim 1, wherein the means for receiving a location indication is a user-input means for receiving user input comprising the location indication.

3. A user interaction system according to claim 2, wherein the user-input means is further configured for receiving a desired lighting effect or a desired lighting effect change, the desired lighting effect and the desired lighting effect change are received for the specific location.

4. A user interaction system according to claim 3, wherein the user interaction system further comprises:
a light effect controller for generating a control signal for a controllable light source of the lighting system to optimally obtain the desired lighting effect or the desired lighting effect change at the specific location,
wherein the generation of the control signals is based on the lighting system model, the lighting system model further comprising information concerning the relation between values of the control signals for the controllable light sources and a response of the respective controllable light sources when receiving the control signals.

5. A user interaction system according to claim 4, wherein the overlay image creator is further configured for generating the overlay image comprising:
information presenting the changed operation of the controllable light source of the lighting system in accordance with the generated control signal,
or
feedback about the feasibility of the desired lighting effect or the desired lighting effect change.

6. A user interaction system according to claim 4, wherein the user interaction system further comprises:
an output means for providing the control signal to the lighting system.

7. A user interaction system according to claim 2, wherein the user-input means is further configured for receiving user-input indicating at a particular moment in time that the camera image is the subarea image.

8. A user interaction system according to claim 7, wherein the camera comprises at least one of: means for detecting a location of the camera, means for detecting a direction in which the camera is directed, a tilt sensor to detect the tilt of the camera, and means for detecting the angle of view of the camera, and the location identification means is configured for detecting which specific subarea of the environment is imaged in the subarea image based on at least one of: the detected location of the camera, the detected direction, the detected tilt, and the detected angle of view, and wherein the location identification means is configured to base the detection of the specific location on the detected specific subarea.

9. A user interaction system according to claim 7 for controlling a lighting system for lighting an environment, the user interaction system comprising:
a display for displaying a subarea image and an overlay image, the subarea image being an image of a specific subarea of the environment,
a means for receiving a location indication,
a location identification means for detecting which specific location in the environment is indicated by the location indication,
an overlay image creator for generating the overlay image comprising information related to a lighting effect which is obtainable by the lighting system at the specific location, the obtainable lighting effect being an effect of at least two controllable light sources of the lighting system, the information related to the obtainable lighting effect being based on a lighting system model representing effects that are obtainable in the environment by controllable light sources of the lighting system
wherein the means for receiving a location indication is a user-input means for receiving user input comprising the location indication
a camera for obtaining a camera image, and wherein the display is further configured for displaying the camera image,
wherein
the camera comprises at least one of: means for detecting a location of the camera, means for detecting a direction in which the camera is directed, a tilt sensor to detect the tilt of the camera, and means for detecting the angle of view of the camera, and
the user-input means is configured to base the location indication on at least one of: the detected location of the camera, the detected direction, the detected tilt, and the detected angle of view.

10. A user interaction system according to claim 1, wherein the obtainable effect is at least one of: the light intensity may locally be increased or decreased, the locally obtainable light colors are a specific subspace of a color space, the light intensity may globally be increased or decreased, the obtainable light colors in an area at and around the specific location are a specific subspace of the color space, the contrast may be increased or decreased in an area at and around the specific location, a colder or warmer color is obtainable, the color temperature may be increased or decreased and an effect of a redirectable controllable light source may be moved.

11. A user interaction system according to claim 1, wherein the overlay image creator is further configured for generating the overlay image comprising information related to one or more controllable light sources of the lighting system, the information of a specific controllable light source is at least one of: position of the specific light source, direction in which light beam of the specific light source can be emitted, footprint of the light beam of the specific light source, colors that can be emitted by the specific light source, intensities that can be emitted by the specific light source, movement or rotation options of the specific light source, or relation between the obtainable effect and the specific light source.

* * * * *